US005234646A

United States Patent [19]

Tanino et al.

[11] Patent Number: 5,234,646

[45] Date of Patent: Aug. 10, 1993

[54] METHOD FOR MOLDING POWDER UNDER COMPRESSION

[75] Inventors: Tadatsugu Tanino; Yoshihiro Furuya, both of Osaka; Toyohiko Takeda, Kobe, all of Japan

[73] Assignee: Shionogi & Co., Ltd., Osaka, Japan

[21] Appl. No.: 927,241

[22] Filed: Aug. 7, 1992

Related U.S. Application Data

[63] Continuation of Ser. No. 753,222, Aug. 30, 1991, abandoned.

[30] Foreign Application Priority Data

Aug. 30, 1990 [JP] Japan .................................. 2-229960

[51] Int. Cl.[5] .............................................. B29C 43/08

[52] U.S. Cl. .................................... 264/120; 264/123; 425/345; 425/353

[58] Field of Search ....................... 264/120, 123, 109; 425/345, 353

[56] References Cited

U.S. PATENT DOCUMENTS

| | | | |
|---|---|---|---|
| 1,803,814 | 5/1931 | Spengler et al. . | |
| 2,260,456 | 10/1941 | Johnson . | |
| 2,949,082 | 8/1960 | McCarley | 425/353 |
| 3,118,183 | 1/1964 | Gex et al. | 425/353 |
| 3,337,915 | 8/1967 | Alexander, Jr. | 425/345 |
| 3,408,963 | 11/1968 | Alexander, Jr. et al. | 425/345 |
| 3,483,831 | 12/1969 | Fujii et al. | 425/345 |
| 4,330,252 | 5/1982 | Bullock et al. | 425/412 |
| 4,601,866 | 7/1986 | David et al. | 264/109 |
| 4,832,880 | 5/1989 | Staniforth | 264/22 |

FOREIGN PATENT DOCUMENTS

| | | |
|---|---|---|
| 1111340 | 7/1961 | Fed. Rep. of Germany . |
| 1584370 | 4/1970 | Fed. Rep. of Germany . |
| 321748 | 11/1929 | United Kingdom . |

*Primary Examiner*—Mary Lynn Theisen
*Attorney, Agent, or Firm*—Morrison & Foerster

[57] ABSTRACT

A method for molding powder under compression by use of a compression molding machine including a horizontally supported turntable provided with bores vertically extending therethrough, and upper pressure rods and lower pressure rods respectively positioned above and below the respective bores, the upper end portion of each lower pressure rod being fitted in the corresponding bore. The method includes subjecting powder contained in each bore to preliminary compression by dropping the corresponding upper pressure rod into the bore by gravity before the compression molding operation.

1 Claim, 1 Drawing Sheet

METHOD FOR MOLDING POWDER UNDER COMPRESSION

This application is a continuation of application Ser. No. 753,222, filed Aug. 30, 1991, now abandoned.

BACKGROUND OF THE INVENTION

1. Field of the Invention

The present invention relates to a method for molding powder under compression, which is used to mold powder into tablets or the like.

2. Description of the Prior Art

When powders of medicine, food, bubble bath, and the like are to be compressed and molded into tablets, a rotary powder compression molding machine which is called a tablet machine is usually employed. The rotary powder compression molding machine includes a disc-shaped turntable which is horizontally supported and rotatable in a predetermined direction about a vertical axis. The turntable is provided with many bores extending vertically therethrough. The bores are arranged at regular intervals in the direction of rotation of the turntable. A pair of pressure rods are respectively disposed above and below each of the bores in such a manner that they can move toward and away from the bore. These upper and lower pressure rods include compression members which are fitted into the bore as the pressure rods move toward the bore. As the turntable rotates, the upper and lower pressure rods are moved together with the turntable in the direction of its rotation.

With the use of such a compression molding machine, a conventional compression molding process is performed as follows. The compression member of each of the lower pressure rods is always fitted in the corresponding bore, thereby closing the lower opening of the bore. In this state, as the turntable rotates, the lower pressure rods are moved downward while moving in the direction of rotation of the turntable. The downward movement of each pressure rod gives a space in the bore to which powder is supplied. As a result, the bores are successively filled with the powder.

Then, the upper and lower pressure rods are pressed first by upper and lower pre-loading rollers, and then by upper and lower pressure rollers, respectively, toward the corresponding bore, so that the powder is compressed and molded into a tablet. The thus produced tablet is pushed out of the bore by the lower pressure rod. In this way, with each revolution of the turntable, tablets are successively produced.

In such a rotary powder compression molding machine, air is removed from the powder by the compression effected by the pre-loading rollers for the purpose of preventing a problem of blowing out of the powder from the bore during the compression effected by the pressure rollers and a problem of capping and lamination in the resultant tablets. These problems are effectively avoided when the powder of excellent flowability is molded, wherein the air can be sufficiently removed from the powder by the compression effected by the pre-loading rollers.

However, when the powder contains a large amount of wax-like material such as vitamin E which softens in heat or a large amount of liquid which becomes viscous by the application of heat, the above problems arise for the following reason. In the conventional compression molding machine, heat is generated through friction between the inner wall of the bore and the two pressure rods corresponding thereto. Thus, the temperature in each bore increases with time. When the compression molding operation continues for a long period of time, the temperature in each bore becomes so high as to soften the wax-like material contained in the powder or allows the liquid contained in the powder to become viscous. The softened wax-like material or viscous liquid then sticks to the wall of the bore and the pressure rods, thereby narrowing or closing the gaps therebetween. This prohibits the air in the powder from being sufficiently removed from the bore during the compression by the pre-loading rollers, allowing the powder containing air therein to be molded into tablets. The resultant tablets may possibly have disadvantageous capping or lamination.

Furthermore, the air contained in the powder is likely to rapidly blow out through the narrowed gap between the bore and the pressure rods, and, together with the air blown out, a large amount of powder may possibly blow out of the bore during the final compression effected by the pressure rollers. As a result, the amount of the powder to be molded into a tablet is greatly decreased. Even from a gap which is not narrowed, a large amount of powder is likely to be spilled out. The powder blown out or spilled out may enter parts of the machine, causing abnormal wearing of the parts.

The above problems caused by the increase in temperature of the bore can be avoided to some extent by lowering the operation speed of the compression molding machine, so as to reduce heat generated through friction between the bore and the pressure rods. The problems may also be prevented by lowering the compression speed so that air can be sufficiently removed from the powder. However, lowering the operation speed will greatly reduce the production efficiency.

SUMMARY OF THE INVENTION

The method for molding powder under compression of this invention, which overcomes the above-discussed and numerous other disadvantages and deficiencies of the prior art, using a compression molding machine including a horizontally supported turntable provided with bores vertically extending therethrough, each bore being provided with an upper pressure rod and a lower pressure rod respectively positioned above and below the bore, comprises the steps of successively filling each bore with a predetermined amount of powder, with an upper end portion of each lower pressure rod being fitted in the corresponding bore, allowing the upper pressure rods to successively fall by gravity into the respective bores, thereby subjecting the powder contained in each bore to preliminary compression, successively compressing the preliminarily compressed powder in the bores, and further successively compressing the compressed powder in the bores, thereby molding the powder in each bore into a tablet.

In the method for molding powder under compression according to the present invention, powder in each bore of the turntable is subjected to preliminary compression by the corresponding upper pressure roller having a predetermined weight which falls thereon by gravity, before the powder is completely compressed by the pre-loading rollers and the pressure rollers. Through the preliminary compression, air in the powder is completely removed from the bore. Furthermore, since the upper pressure rod falls by gravity onto the powder in the corresponding bore for the preliminary compression, a relatively long period of time can be used for the preliminary compression even when the turntable rotates at a high speed for high-speed compression molding operations. Thus, even when using powder containing a wax-like material, air can be removed from the powder through the preliminary compression irrespective of the lapse of time. As a result, the possibility of causing any capping or lamination in the resultant tablets and the possibility that any appreciable amount of powder will be blown out of the bore with time are eliminated.

Thus, the invention described herein makes possible the objective of providing a method for molding powder under compression, in which air in the powder can be completely removed before the powder is subjected to compression molding, so that tablets without capping or lamination can be produced at high speed operation.

BRIEF DESCRIPTION OF THE DRAWING

This invention may be better understood and its numerous objects and advantages will become apparent to those skilled in the art by reference to the accompanying drawing as follows.

DESCRIPTION OF THE PREFERRED EMBODIMENTS

Figure 1:
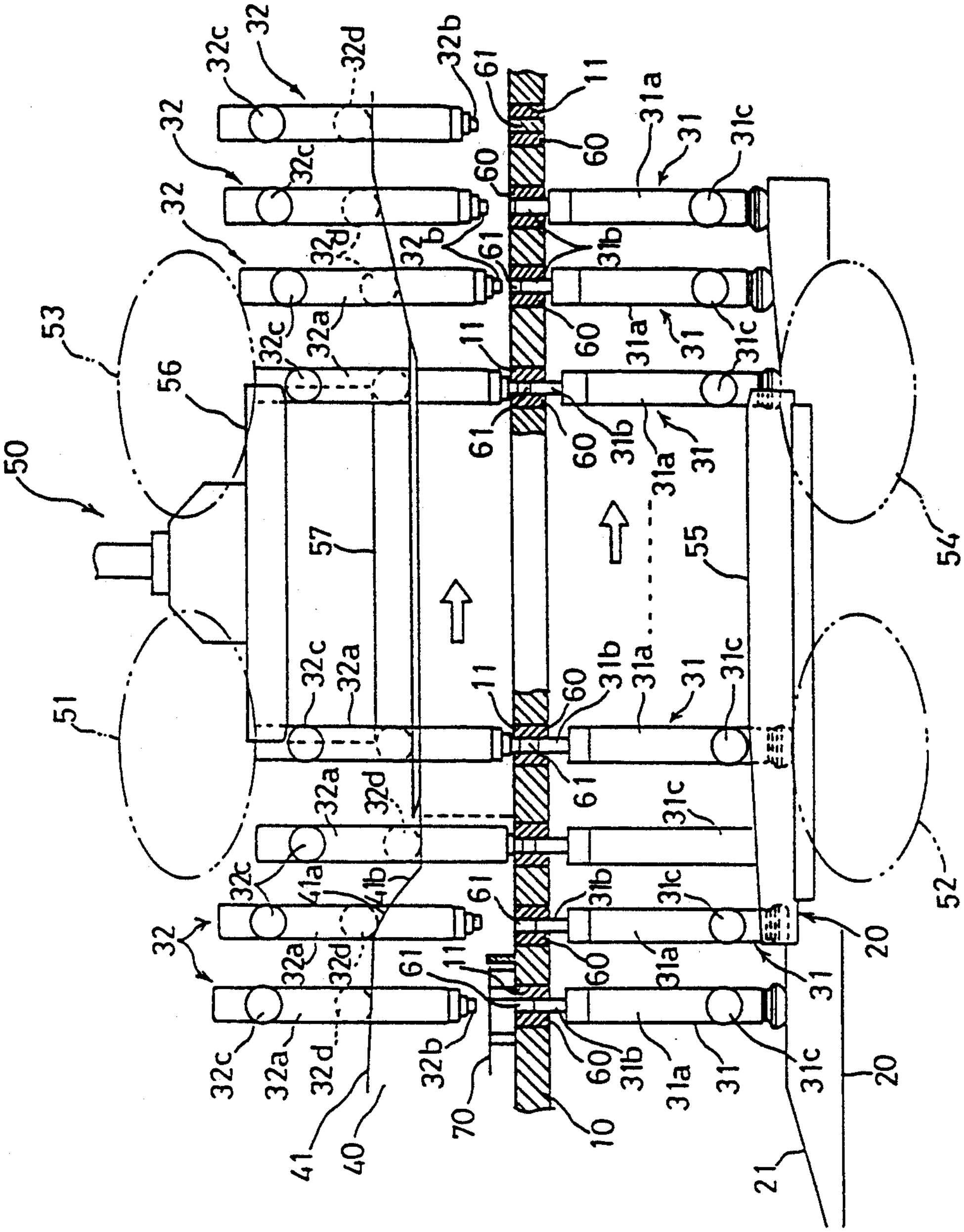
FIG. 1 is a schematic diagram showing a powder compression molding machine used for carrying out a method of the present invention.

The method for molding powder under compression according to the present invention is carried out by the use of a rotary powder compression molding machine such as shown in FIG. 1.

The powder compression molding machine of FIG. 1 comprises a horizontally supported turntable 10 in the shape of a disc which rotates about a vertical axis and is provided with many holes 11 vertically extending therethrough. The holes 11 are arranged in a coaxial circular line at regular intervals in the direction of rotation of the turntable 10. For the simplicity of explanation, the direction of rotation of the turntable 10 is hereinafter referred to as the "turntable-rotating direction".

In each of the holes 11, a cylindrical molding block 60 having a bore 61 vertically extending therethrough is fitted. The bore 61 has a predetermined diameter throughout the length thereof.

An upper pressure rod 32 and a lower pressure rod 31 both of which are movable upward and downward are respectively positioned above and below each of the holes 11, so that the bore 61 of the hole 11 is vertically aligned with the corresponding upper and lower pressure rods 32 and 31.

Each of the lower pressure rods 31 includes a vertically supported lower cylindrical body **31*a* and a lower cylindrical compressing member 31*b* coaxially extending upward from the lower cylindrical body 31*a*. the diameter of the lower compressing member 31*b* is approximately the same as that of the bore 61. When the lower pressure rod 31 moves upward, the lower compressing member 31*b* thereof is moved upward to fit into the corresponding bore 61. A guide roller 31*c* is mounted on a lower section of each lower cylindrical body 31*a*** in such a manner that it can rotate with its rotation axis being set in a horizontal direction.

Each of the upper pressure rods 32 includes a vertically supported upper cylindrical body **32*a* and an upper cylindrical compressing member 32*b* coaxially extending downward from the upper cylindrical body 32*a*. The diameter of the upper compressing member 32*b* is approximately the same as that of the bore 61. When the upper pressure rod 32 moves downward, the upper compressing member 32*b* is moved downward to fit into the corresponding bore 61. A guide roller 32*c* is mounted on an upper section of each upper cylindrical body 32*a* in such a manner that it can rotate with its rotation axis being set in a horizontal direction. Each upper cylindrical body 32*a* is provided with another guide roller 32*d* mounted on the center thereof and positioned on the side opposite to that provided with the guide roller 32*c*** in such a manner that it can rotate with its rotation axis being set in a horizontal direction.

The compression molding machine further includes an upper guide 40 and a lower guide 20 for guiding the upper pressure rods 32 and lower pressure rods 31, respectively. As t he turntable 10 rotates, all the upper and lower pressure rods 32 and 31 move together with the turntable 10. While they are moving in the turntable-rotating direction, the lower end of each lower pressure rod 31 is guided along a guide surface 21 of the lower guide 20, and the guide roller **32*d* of each upper pressure rod 32 is guided along a guide surface 41 of the upper guide 40**.

A hopper (not shown) containing powder to be molded is disposed at a predetermined position above the turntable 10. A portion of the turntable 10 facing the hopper serves as a "powder feed region" where the powder is supplied from the hopper into each bore 61. A feed shoe 70 is disposed in contact with the upper surface of the turntable 10 at a position slightly away from the powder feed region toward the turntable-rotating direction. As the turntable 10 rotates, the feed shoe 70 slides along the turntable 10 so as to scrape off any excessive powder in each bore 61.

A pressure mechanism 50 is appropriately spaced apart from the feed shoe 70 toward the turntable-rotating direction. The pressure mechanism 50 includes upper and lower pre-loading rollers 51 and 52 respectively disposed above and below the turntable 10, and also includes upper and lower pressure rollers 53 and 54 respectively disposed above and below the turntable 10. The pressure rollers 53 and 54 are located away from the pre-loading rollers 51 and 52 in the turntable-rotating direction, respectively.

As the turntable 10 rotates together with the upper and lower pressure rods 32 and 31, the lower ends of the lower pressure rods 31 successively come into contact with the lower pre-loading roller 52 and then with the lower pressure roller 54, so that each lower pressure rod 31 is pressed upward first by the preloading roller 52 and then by the pressure roller 54. In the same manner, the upper ends of the upper pressure rods 32 successively come into contact with the upper pre-loading roller 51 and then with the upper pressure roller 53, so that each upper pressure rod 32 is pressed downward first by the pre-loading roller 51 and then by the pressure roller 53.

Between the upper pre-loading roller 51 and the upper pressure roller 53, two pressure guides 56 and 57 are horizontally positioned. The two pressure guides 56 and 57 respectively abut against the guide rollers **32*c* and 32*d* of the upper pressure rods 32 pressed downward by the pre-loading roller 51, and guide the respective guide rollers 32*c* and 32*d* so that the upper pressure rods 32** can be kept pressed downward.

Likewise, between the lower pre-loading roller 52 and the lower pressure roller 54, two pressure guides 55 are located horizontally so as to abut against the guide rollers 31c of the lower pressure rods 31 pressed upward by the pre-loading roller 52, and to guide the guide rollers 31c so that the lower pressure rods 31 can be kept pressed upward.

A portion of the guide surface 21 of the lower guide 20 corresponding to the powder feed region is horizontal. This horizontal portion extends in the turntable-rotating direction to a position where the lower pre-loading roller 52 is located. The guide surface 21 has a first inclined portion which is located adjacent to the above horizontal portion in the direction opposite to the turntable-rotating direction. The first inclined portion is gradually inclined downward toward the direction opposite to the turntable-rotating direction. Therefore, as each of the lower pressure rods 31 is moved along the first inclined portion of the guide surface 21 by the rotation of the turntable 10, it is gradually moved upward until it reaches the horizontal portion corresponding to the powder feed region. When the lower pressure rod 31 reaches the powder feeding region, it is in such a position as to allow a predetermined length of the lower compressing member 31b to fit into the corresponding bore 61. The lower pressure rod 31 maintains the fixed position in the vertical direction until it reaches the region provided with the pre-loading roller 52.

The guide surface 21 is not in contact with the lower pressure rods 31 in a region where the pressure mechanism 50 is located (hereinafter referred to as a "pressure mechanism region"). The guide surface 21 further has a second inclined portion which is inclined upward from a position corresponding to the lower pressure roller 54 toward the turntable-rotating direction. As the lower pressure rods 31 move along this second inclined portion, the lower compressing member 31b of each lower pressure rod 31 is further moved upward within the bore 61, so that the upper end thereof reaches the same level as that of the upper surface of the turntable 10. A further portion of the guide surface 21 adjacent to the second inclined portion is gradually inclined downward toward the turntable-rotating direction until it reaches the first inclined portion which is inclined upward in the turntable-rotating direction to the above-mentioned horizontal portion.

On the other hand, the guide surface 41 of the upper guide 40 is horizontal except for inclined planes described below a horizontal plane corresponding to the pressure mechanism region. When each upper pressure rod 32 is guided along the horizontal portion of the guide surface 41, it maintains a fixed position above the corresponding bore 61 where the upper compressing member 32b thereof is not fitted in the bore 61.

The guide surface 41 includes a first inclined plane 41a which is positioned above the portion of the guide surface 21 located adjacent to the horizontal portion thereof in the turntable-rotating direction. A second inclined plane 41b is located adjacent to the first inclined plane 41a in the turntable-rotating direction. The first and second inclined planes 41a and 41b are both inclined downward toward the turntable-rotating direction, but the tilt angle of the second inclined plane 41b is larger than that of the first inclined plane 41a. The tilt angle of the first inclined plane 41a is larger than that of the inclined plane of an upper guide of a conventional compression molding machine. Therefore, the total length of the first and second inclined planes 41a and 41b is sufficiently shorter than that of the inclined plane of the upper guide of the conventional compression molding machine.

The guide roller 32d of each upper pressure rod 32 is guided along the first and second inclined planes 41a and 41b to be gradually moved downward, thereby allowing the upper pressure rod 32 to move downward. While the guide roller 32d is being guided along the second inclined plane 41b, the upper compressing member 32b of the upper pressure rod 32 fits into the corresponding bore 61 by gravity. The horizontal plane of the guide surface 41 positioned adjacent to the second inclined plane 41b in the turntable-rotating direction and corresponding to the pressure mechanism region serves to keep the upper pressure rod 32 in such a position as to hold the upper compressing member 32b within the bore 61.

The operation of the powder compression molding machine of FIG. 1 constructed as described above will now be described.

As the turntable 10 rotates, the upper and lower pressure rods 32 and 31 are moved together with the turntable 10 at the same speed and in the same direction. The lower compression member 31b of each lower pressure rod 31 is always fitted in the corresponding bore 61, thereby closing the lower opening of the bore 61. When one of the bores 61, for example, reaches the powder feed region, powder is supplied from the hopper into the bore 61. The bore 61 then moves in the turntable-rotating direction to reach the feed shoe 70. The feed shoe 70 scrapes off the excessive powder, so that the bore 61 is filled with a predetermined amount of powder.

After the bore 61 passes along the feed shoe 70, the corresponding upper pressure rod 32 is moved downward along the first inclined plane 41a and then along the second inclined plane 41b. While the upper pressure rod 32 is being moved along the second inclined plane 41b, the upper compressing member 32b thereof falls into the bore 61 by gravity, thereby moderately compressing the powder therein. This is a preliminary compression process through which any air contained in the powder is discharged out of the bore 61 through a gap between the inner wall of the bore 61 and the peripheral wall of the lower compression member 31b and also through a gap between the inner wall of the bore 61 and the peripheral wall of the upper compressing member 32b. In order to ensure the preliminary compression of the powder, the weight of the entire upper pressure rod 32 is about twice as much as that of an upper pressure rod used in a conventional compression molding machine.

After the preliminary compression, the upper and lower pressure rods 32 and 31 are first pressed by the upper and lower pre-loading rollers 51 and 52, respectively, so as to allow the upper and lower compressing members 32b and 31b to compress the powder in the bore 61. Then, the bore 61 and the corresponding upper and lower pressure rods 32 and 31 are further moved in the turntable-rotating direction to a position where the upper and lower pressure rollers 53 and 54 are located. At that position, the upper and lower pressure rods 32 and 31 are pressed a second time by the upper and lower pressure rollers 53 and 54, respectively, so that the upper and lower compressing members 32b and 31b further compress the powder in the bore 61 to produce a tablet.

As described above, in the compression molding method according to the present invention, the powder is subjected to the preliminary compression by the upper pressure rod 32 before it is compressed by the upper and lower pre-loading rollers 51 and 52. Since the preliminary compression is effected by the upper pressure rod 32 falling into the bore 61 by gravity, the load applied to the powder in the preliminary compression is determined by the weight of the upper pressure rod 32, which is set at such a level that air can be sufficiently removed from the powder. In this example, the weight of the upper pressure rod 32 is set to be about 800 g. Furthermore, since the upper pressure rod 32 is moved along the second inclined plane 41*b* of the upper guide 40 to fall into the bore 61 at a high speed, the upper pressure rod 32 can apply pressure to the powder by its own weight for a relatively long period of time, thereby further assuring effective air removal.

In a conventional compression molding machine, temperature rise is likely to occur in the bore 61 with time through friction between the bore containing powder and the upper pressure rod and also between the bore and the lower pressure rod. As described above, when powder containing a wax-like material is used, the wax-like material is softened in the bore having a high temperature.

On the other hand, according to the present invention, the preliminary compression is effected by the fall of the upper pressure rod 32 by gravity. This minimizes the temperature rise by friction in the bore 61 even when the turntable 10 rotates at a high speed, thus preventing softening of the wax-like material contained in the powder. Even if the temperature in the bore 61 becomes high enough to soften the wax-like material contained in the powder, neither capping nor lamination occurs in the resulting tablet. This is because the air in the powder can be sufficiently removed from the bore 61 by the preliminary compression process. Furthermore, because of the sufficient removal of the air, no appreciable amount of the powder will be blown out of the bore 61 during the high-speed compression effected by the pre-loading rollers 51 and 52 or by the pressure rollers 53 and 54.

In order to evaluate the effect of the preliminary compression according to the present invention, first, wax-like vitamin E (d-α-tocopherol succinate) was used to produce tablets containing the vitamin E at a high ratio (50 mg/240 mg) in a conventional compression molding machine. The rotational speed of the turntable was set to be 40 r.p.m. (1200 tablets per minute). After two hours of compression molding operation, capping and lamination began to arise in many of the produced tablets. Furthermore, a large amount of powder was blown out of the bores during the operation. When the rotational speed of the turntable was decreased to 30 r.p.m., capping and lamination did not arise in the produced tablets before four hours of the compression molding operation, after which they began to arise in many of the produced tablets. The weight of the upper pressure rod was about 400 g.

Then, the same powder was used to produce tablets using the compression molding machine of FIG. 1 according to the method of the invention. When the rotational speed of the turntable 10 was set to be 40 r.p.m., neither capping nor lamination arose in the produced tablets regardless of the operation time. Only a negligible amount of powder blew out of the bore 61 during the compression operation. In this case, the weight of the upper pressure rod was about 800 g.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for molding powder under compression, by use of a compression molding machine including a horizontally supported turntable provided with bores vertically extending therethrough, each bore being provided with an upper pressure rod and a lower pressure rod respectively positioned above and below the bore, said method comprising the steps of:

successively filling each bore with a predetermined amount of powder, with an upper end portion of each lower pressure rod being fitted in the corresponding bore;

allowing the upper pressure rods guided along two successive downward inclined planes to successively fall by gravity into the respective bores, thereby subjecting the powder contained in each bore to preliminary compression;

successively compressing the preliminary compressed powder in the bores for a prescribed period of time; and further successively compressing the compressed powder in the bores, thereby molding the powder in each bore into a tablet;

wherein the upper pressure rods are guided along said downward inclined planes to fall into the corresponding bores for effecting said preliminary compression;

and wherein the weight of upper pressure rod is approximately 800 g.

* * * * *